A. R. Fenner,
Saw Set.
No. 97,491.  Patented Dec. 7, 1869.
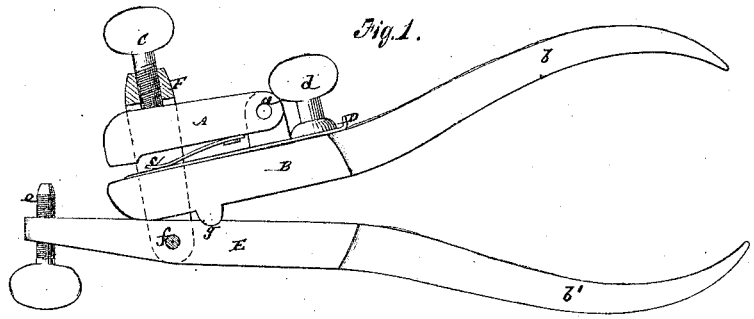
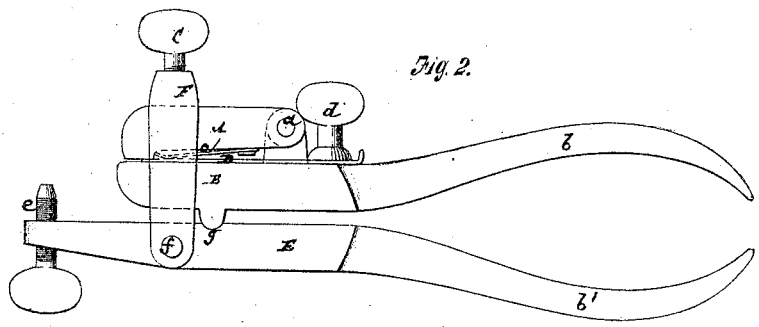
Witnesses.
Fred. Haynes
J. M. Coombs
A. R. Fenner
per Coombs &
Attorneys.

United States Patent Office.

A. R. FENNER, OF COLD BROOK, NEW YORK.

Letters Patent No. 97,491, dated December 7, 1869.

IMPROVEMENT IN SAW-SETS.

The Schedule referred to in these Letters Patent and making part of the same.

*To all whom it may concern:*

Be it known that I, A. R. FENNER, of Cold Brook, in the county of Herkimer, and State of New York, have invented a new and useful Improvement in Saw-Sets, of which the following is a full, clear, and exact description, reference being had to the accompanying drawing, forming part of this specification, and in which—

Figures 1 and 2 represent side or longitudinal views of my improved saw-set in its open and closed positions.

Similar letters of reference indicate corresponding parts in both figures.

My invention consists in a certain combination of an angle-bar for regulating the set, and forming the one operating lever or handle of the tool with the setting-jaws, the one of which constitutes the other operating lever or handle, whereby a general simplicity and effectiveness is secured to the device, and a regularity of set given to the saw for all thicknesses of it, however varied.

Referring to the accompanying drawing—

A represents the one, and B the other jaw, which, on being closed and suitably turned or pressed to one side, serve to grip the teeth of the saw and give them their set.

The one of these jaws, A, is pivoted, as at *a*, to the other jaw B, which is extended in the rear to form the one operating lever or handle *b*.

C is a screw, for regulating the distance of the jaws apart; and *c*, a spring, for holding or throwing them open.

D is a gauge-plate, adjustable on slackening a holding-screw, *d*, thereto, along the jaw B, to regulate depth or entry of the saw between the jaws when using the tool.

E is what I term an angle-bar, for regulating the set, and which is extended in the rear to form the other operating lever or handle, *b'*, also is extended in front beyond the jaws, where it is provided with an angle or set-regulating screw, *e*.

F is a strap-piece, pivoted, as at *f*, to said angle-bar, and carrying at its other end the screw C.

This strap serves to hold together the angle-bar E and jaws A and B, when the latter are slipped to their place, with the one jaw B working on a fulcrum, as at *g*, in or on the angle-bar.

The extension of the angle-bar E beyond the jaws A and B is important, inasmuch as by its set-regulating screw *e*, it serves to insure a uniform set to the saw when its blade varies in thickness, giving, of course, more bend or angle to a thin than a thick portion.

This will be apparent when it is considered that in using the tool, the jaws, in closing on the saw, occupy a fixed relation, as it were, to the point of the screw *e*, against which the side of the tooth or saw-blade jams in turning or working the tool to produce the set. The screw *e* may, accordingly, be considered a part of the angle-bar or projection therefrom, but being adjustable, it provides for varying the amount of set.

What is here claimed, and desired to be secured by Letters Patent, is—

1. The combination, with the jaws A and B, the one of which is extended to form a handle, *b*, of the angle-bar E, constructed and arranged as herein described.

2. The combination of the set-regulating screw *e*, the angle-bar E, the jaws A and B, the levers or handles *b b'*, the strap F, with its screw C, and the spring *c*, essentially as shown and described.

3. The combination of the gauge D with the jaws A B, and angle-bar E, substantially as specified.

A. R. FENNER.

Witnesses:
H. B. FENNER,
T. L. ANDREWS.